(12) United States Patent
Nansaka et al.

(10) Patent No.: US 9,672,993 B2
(45) Date of Patent: Jun. 6, 2017

(54) ELECTRICITY STORAGE DEVICE AND ELECTRICITY STORAGE MODULE

(71) Applicant: JM Energy Corporation, Hokuto-shi (JP)

(72) Inventors: Kenji Nansaka, Kofu (JP); Takashi Chiba, Nirasaki (JP)

(73) Assignee: JM ENERGY CORPORATION, Hokuto-shi (JP)

( * ) Notice: Subject to any disclaimer, the term of this patent is extended or adjusted under 35 U.S.C. 154(b) by 37 days.

(21) Appl. No.: 14/442,271

(22) PCT Filed: Nov. 11, 2013

(86) PCT No.: PCT/JP2013/080401
§ 371 (c)(1),
(2) Date: May 12, 2015

(87) PCT Pub. No.: WO2014/077214
PCT Pub. Date: May 22, 2014

(65) Prior Publication Data
US 2016/0247637 A1    Aug. 25, 2016

(30) Foreign Application Priority Data

Nov. 15, 2012  (JP) .................................. 2012-251102
Jan. 24, 2013  (JP) .................................. 2013-011361

(51) Int. Cl.
*H01G 11/74*    (2013.01)
*H01M 2/30*    (2006.01)
(Continued)

(52) U.S. Cl.
CPC ............. *H01G 11/74* (2013.01); *H01G 11/10* (2013.01); *H01G 11/22* (2013.01); *H01G 11/82* (2013.01);
(Continued)

(58) Field of Classification Search
None
See application file for complete search history.

(56) References Cited

U.S. PATENT DOCUMENTS 8,658,298 B2    2/2014  Watanabe et al.
2008/0280193 A1*  11/2008  Takagi .................... H01M 4/38
                                                                 429/94
(Continued)

FOREIGN PATENT DOCUMENTS

CN    102057520        5/2011
JP    2009-301874 A   12/2009
(Continued)

OTHER PUBLICATIONS

Extended European Search Report issued Oct. 14, 2015 in Patent Application No. 13856053.7.
(Continued)

*Primary Examiner* — Dion R Ferguson
(74) *Attorney, Agent, or Firm* — Oblon, McClelland, Maier & Neustadt, L.L.P.

(57) ABSTRACT

An electrical storage device includes a casing that has an opening, an electrode assembly that is placed inside the casing, a terminal plate that is electrically connected to the electrode assembly, and a holder that is provided to surround the terminal plate, the terminal plate having a step or a slope in an area in which the terminal plate comes in contact with the holder.

10 Claims, 8 Drawing Sheets

(51) Int. Cl.
*H01M 2/20* (2006.01)
*H01G 11/82* (2013.01)
*H01G 11/10* (2013.01)
*H01G 11/22* (2013.01)
*H01G 2/04* (2006.01)
*H01G 11/06* (2013.01)

(52) U.S. Cl.
CPC ............ *H01M 2/202* (2013.01); *H01M 2/30* (2013.01); *H01G 2/04* (2013.01); *H01G 11/06* (2013.01); *Y02E 60/13* (2013.01)

(56) References Cited

U.S. PATENT DOCUMENTS

| | | | | |
|---|---|---|---|---|
| 2009/0061326 | A1* | 3/2009 | Hirose | ............... H01M 2/0257 429/338 |
| 2009/0122468 | A1* | 5/2009 | Miura | ..................... H01G 9/10 361/518 |
| 2009/0273886 | A1* | 11/2009 | Miura | ................... H01G 9/008 361/518 |
| 2010/0081048 | A1 | 4/2010 | Nansaka et al. | |
| 2010/0216001 | A1* | 8/2010 | Byun | ................... H01M 2/263 429/94 |
| 2011/0092111 | A1 | 4/2011 | Tsuchiya et al. | |
| 2011/0200870 | A1 | 8/2011 | Kim et al. | |
| 2011/0229753 | A1* | 9/2011 | Kim | ......................... H01G 9/14 429/149 |
| 2012/0281339 | A1 | 11/2012 | Mizukami et al. | |
| 2013/0155575 | A1* | 6/2013 | Mori | ..................... H01G 9/008 361/500 |
| 2014/0120392 | A1 | 5/2014 | Ueno et al. | |

FOREIGN PATENT DOCUMENTS

| | | |
|---|---|---|
| JP | 2010-80355 A | 4/2010 |
| JP | 2012-99746 A | 5/2012 |
| JP | 2012-99746 A | 5/2012 |
| JP | 2012-123946 A | 6/2012 |
| JP | 2012-123946 A | 6/2012 |
| KR | 10-2011-0008323 A | 1/2011 |
| KR | 10-2011-0093372 A | 8/2011 |

OTHER PUBLICATIONS

U.S. Appl. No. 14/650,726, filed Jun. 9, 2015, Nansaka et al.
International Search Report issued Feb. 4, 2014, in PCT/JP2013/080401, filed Nov. 11, 2013.
Office Action issued Jun. 17, 2016 in Korean Patent Application No. 10-2015-7015803 (with English language translation).
Chinese Office Action issued Dec. 5, 2016 for Application No. 201380059369.3 with computer-generated English Translation (14 pages).
Office Action issued Mar. 22, 2017 in Japanese Patent Application No. 2014-546972 (with unedited computer generated English translation).

* cited by examiner

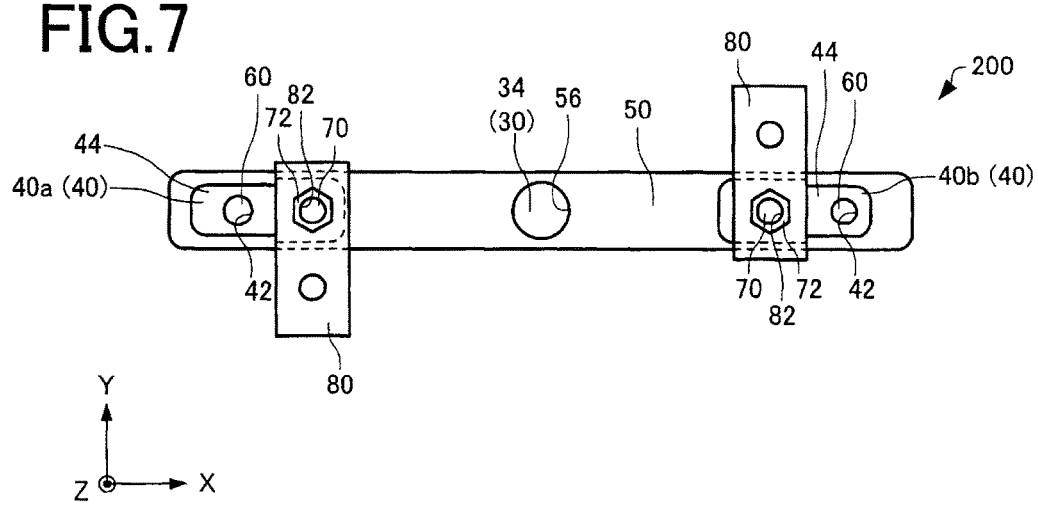
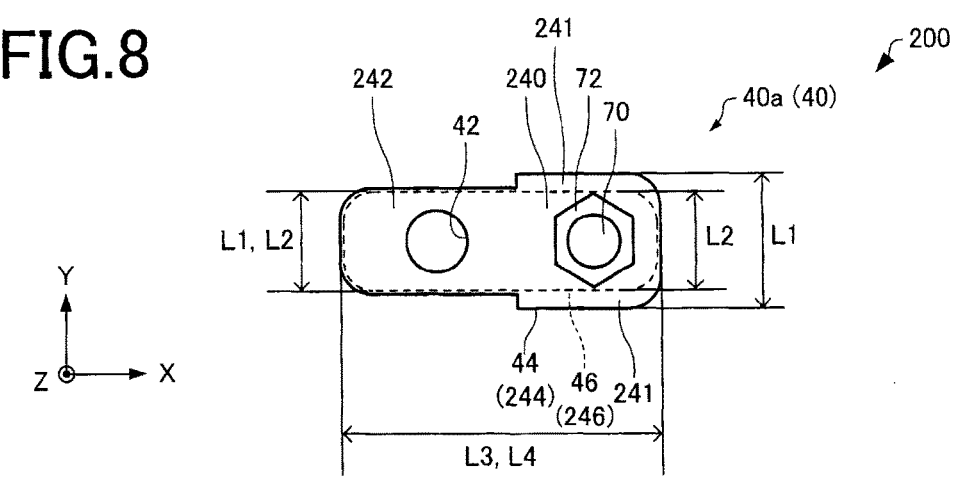

ELECTRICITY STORAGE DEVICE AND ELECTRICITY STORAGE MODULE

TECHNICAL FIELD

The present invention relates to an electrical storage device and an electrical storage module.

BACKGROUND ART

When producing an electrical storage module using a square electrical storage device (energy storage cell), a plurality of electrical storage devices are stacked using a bus bar (conductive plate). The bus bar is placed so as to come in contact with a terminal plate provided to a sealing plate, and the plurality of electrical storage devices are connected in series through the bus bar to obtain an electrical storage module, for example (see JP-A-2010-80355, for example).

In recent years, the size of the electrical storage device has been increasingly reduced, and it has become indispensable to reduce the size of each member included in the electrical storage device. Since the area of the terminal plate decreases when the size of the casing is reduced, the area of contact between the terminal plate and the bus bar tends to decrease, and the contact resistance between the terminal plate and the bus bar may increase. The size of a holder that holds the sealing plate decreases when a situation in which the contact resistance between the terminal plate and the bus bar increases is prevented by the sacrifice of part of the holder. In such a case, when a torque pressure is applied in the rotation direction of a nut when securing the bus bar on the terminal plate by fitting a nut to a bolt, the holder may be tilted in the rotation direction, and the holding power of the holder that holds the terminal plate may decrease, whereby the terminal plate may be displaced from a predetermined position, for example. As a result, the terminal plate may be disconnected from an electrode assembly placed inside the casing.

SUMMARY OF THE INVENTION

Technical Problem

An object of several aspects of the invention is to provide an electrical storage device that can prevent the holding power of the holder that holds the terminal plate from being excessively decreased while reducing the contact resistance between the terminal plate and the bus bar. Another object of several aspects of the invention is to provide an electrical storage module that includes the electrical storage device.

Solution to Problem

The invention was conceived in order to solve at least some of the above problems. The invention is not limited to the following aspects or application examples.

Application Example 1

According to one aspect of the invention, an electrical storage device includes:
a casing that has an opening;
an electrode assembly that is placed inside the casing;
a terminal plate that is electrically connected to the electrode assembly; and
a holder that is provided to surround the terminal plate, the terminal plate having a step or a slope in an area in which the terminal plate comes in contact with the holder.

Note that the expression "on" or "over" used herein (e.g., "A specific member ("member B") is formed "on" or "over" another specific member ("member A")"), covers a case where the member B is formed directly on or over the member A, and a case where the member B is formed on or over the member A through still another member.

Note that the expression "electrical connection" may be used herein when referring to a situation in which a specific member ("member C") is electrically connected to another specific member ("member D"), for example. In this case, the member C may be electrically connected directly to the member D, or may be electrically connected to the member D through still another member.

Application Example 2

In the electrical storage device according to Application Example 1, the area of a first plane of the terminal plate that is situated on the outer side may be larger than the area of a second plane of the terminal plate that is situated opposite to the first plane.

Application Example 3

In the electrical storage device according to Application Example 2, a third side of the terminal plate that connects the first plane and the second plane may have the step.

Application Example 4

The electrical storage device according to any one of Application Examples 1 to 3 may be a lithium-ion capacitor.

Application Example 5

In the electrical storage device according to any one of Application Examples 1 to 4, a hole may be formed in the terminal plate, and the holder may have a protrusion that is situated in the hole.

Application Example 6

According to another aspect of the invention, an electrical storage module includes:
the electrical storage device according to Application Example 2 or 3,
the first plane of the terminal plate included in the electrical storage device being electrically connected to the first plane of the terminal plate included in another electrical storage device through a connection member.

Advantageous Effects of the Invention

The electrical storage device is configured so that the holder is provided to surround (on the side of) the terminal plate. The holder is formed of an insulating member. The holder is preferably formed of a resin or the like. The terminal plate has a step or a slope in an area in which the terminal plate comes in contact with the holder. This makes it possible to prevent the holding power of the holder that holds the terminal plate from being excessively decreased while reducing the contact resistance between the terminal plate and the bus bar, and implement a compact electrical storage device.

BRIEF DESCRIPTION OF DRAWINGS

FIG. 7 is a plan view schematically illustrating an electrical storage device according to a first modification.

FIG. 8 is a plan view schematically illustrating an electrical storage device according to a first modification.

DESCRIPTION OF EMBODIMENTS

Exemplary embodiments of the invention are described below with reference to the drawings. Note that the invention is not limited to the following exemplary embodiments. It is intended that the invention includes various modifications that may be practiced without departing from the scope of the invention.

1. Electrical Storage Device

Figure 1:
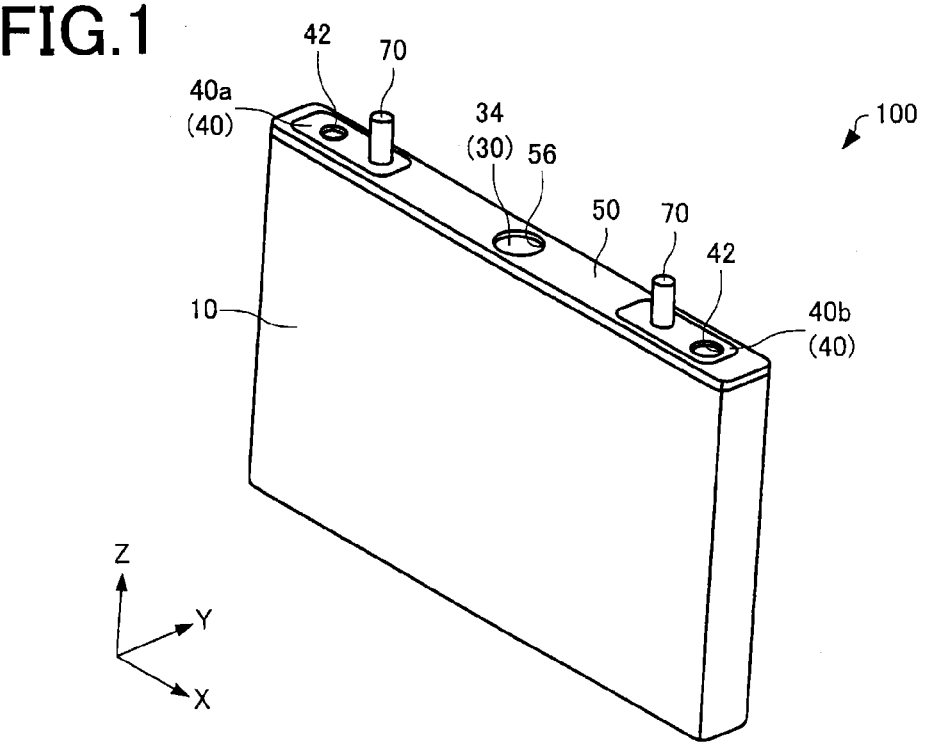
FIG. 1 is a perspective view schematically illustrating an electrical storage device according to one embodiment of the invention.
Figure 2:
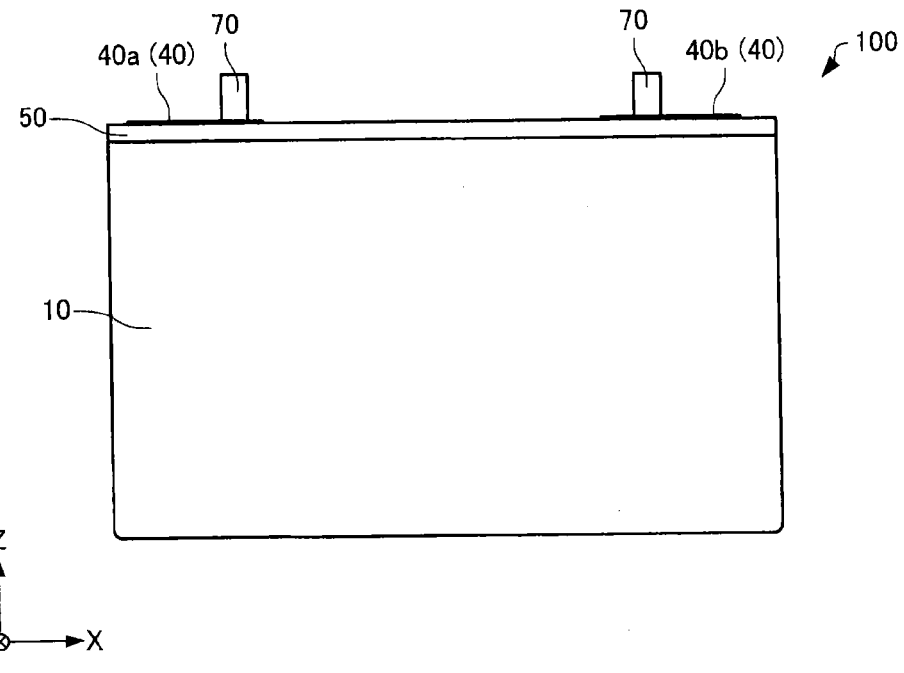
FIG. 2 is a front view schematically illustrating an electrical storage device according to one embodiment of the invention.
Figure 3:
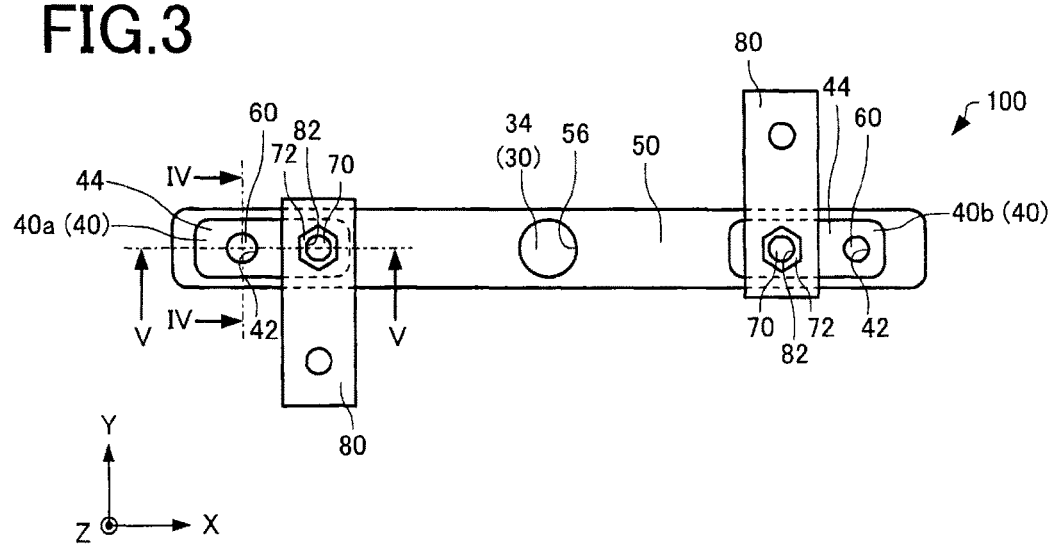
FIG. 3 is a plan view schematically illustrating an electrical storage device according to one embodiment of the invention.
Figure 4:
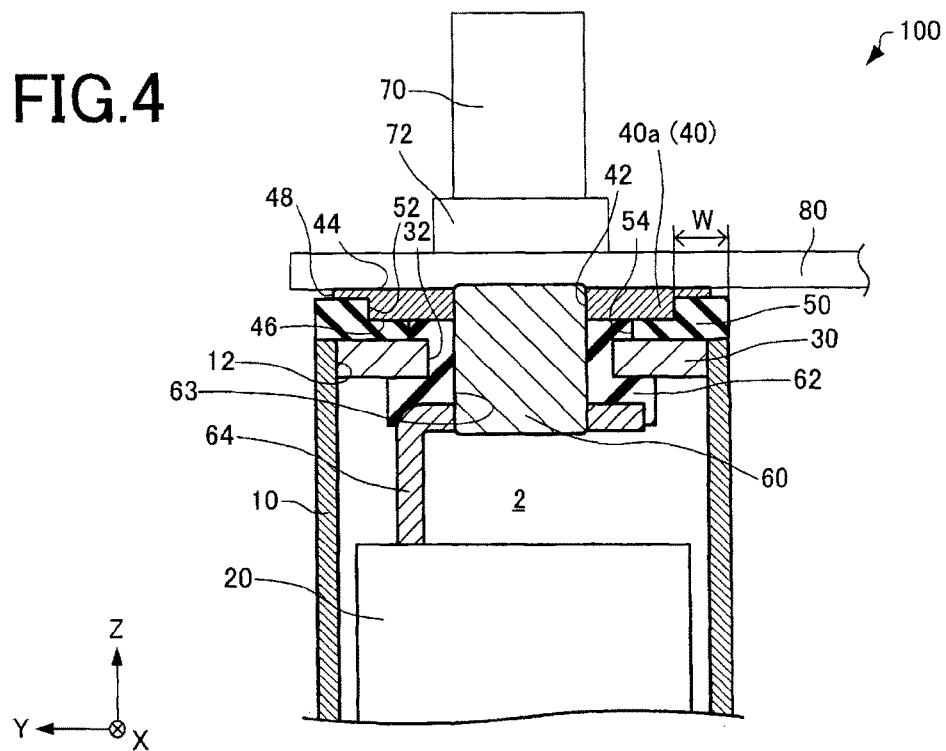
FIG. 4 is a cross-sectional view schematically illustrating an electrical storage device according to one embodiment of the invention.
Figure 5:
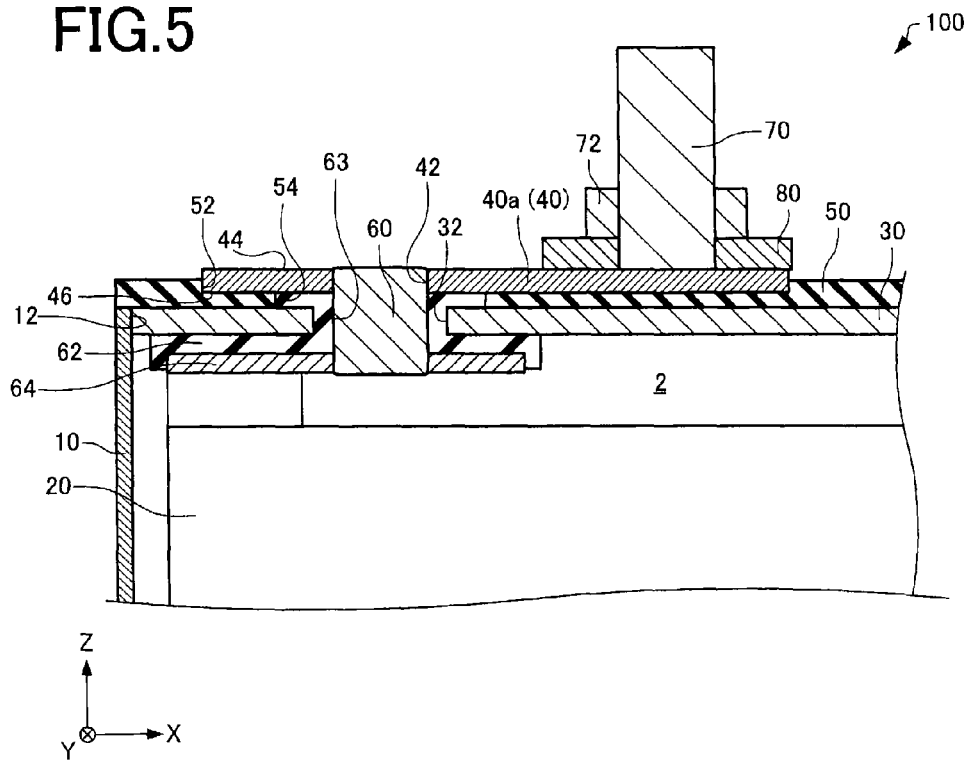
FIG. 5 is a cross-sectional view schematically illustrating an electrical storage device according to one embodiment of the invention.
Figure 6:
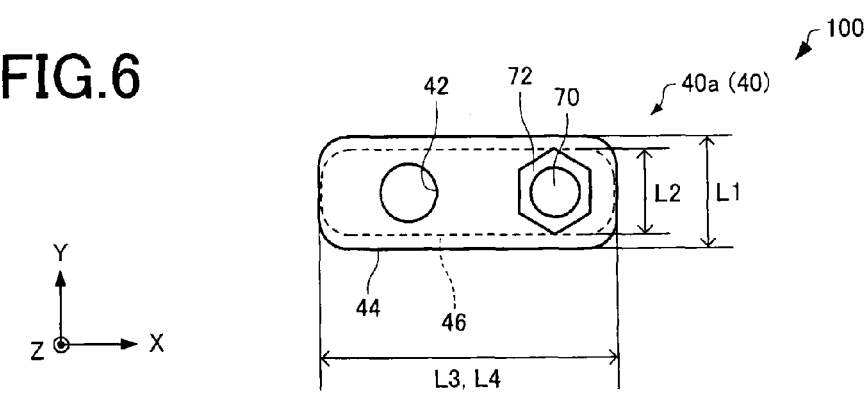
FIG. 6 is a plan view schematically illustrating an electrical storage device according to one embodiment of the invention.

An electrical storage device according to one embodiment of the invention is described below with reference to the drawings. FIG. 1 is a perspective view schematically illustrating an electrical storage device 100 according to one embodiment of the invention. FIG. 2 is a front view (perpendicular to the Y-axis direction) schematically illustrating the electrical storage device 100 according to one embodiment of the invention. FIG. 3 is a plan view (perpendicular to the Z-axis direction) schematically illustrating the electrical storage device 100 according to one embodiment of the invention. FIG. 4 is a cross-sectional view (taken along the line IV-IV in FIG. 3) schematically illustrating the electrical storage device 100 according to one embodiment of the invention. FIG. 5 is a cross-sectional view (taken along the line V-V in FIG. 3) schematically illustrating the electrical storage device 100 according to one embodiment of the invention. FIG. 6 is a plan view schematically illustrating the electrical storage device 100 according to one embodiment of the invention.

In FIGS. 1 and 2, a nut 72 and a bus bar 80 are omitted for convenience of illustration. In FIGS. 4 and 5, an electrode assembly 20 is illustrated in a simplified manner. In FIG. 6, the members other than a terminal plate 40a (40), a bolt 70, and the nut 72 are omitted. In FIGS. 1 to 6 and the like, the X-axis, the Y-axis, and the Z-axis are orthogonal to each other.

As illustrated in FIGS. 1 to 6, the electrical storage device 100 includes a casing 10, the electrode assembly 20, a sealing plate 30, the terminal plate 40, a holder 50, and the bolt 70. The electrical storage device 100 may further include an internal terminal 60, a gasket 62, a lead 64, and the nut 72. The electrical storage device 100 may further include the bus bar (connection member) 80. The bus bar 80 is provided on a first plane 44 of the terminal plate 40. The bus bar 80 is a member that electrically connects a plurality of electrical storage devices 100 when producing an electrical storage module.

The electrical storage device 100 is a lithium-ion capacitor, a secondary battery, an electrical double-layer capacitor, or the like. The following description illustrates an example in which the electrical storage device 100 is a lithium-ion capacitor.

The casing 10 holds the electrode assembly 20 and an electrolyte solution. The shape of the casing 10 is not particularly limited as long as the casing 10 can hold the electrode assembly 20 and the electrolyte solution. In the example illustrated in the drawings, the casing 10 has an approximately box shape in which the thickness (i.e., the dimension in the Z-axis direction) is smaller than the width (i.e., the dimension in the Y-axis direction) and the length (i.e., the dimension in the X-axis direction). As illustrated in FIGS. 4 and 5, the casing 10 has an opening 12 that opens upward (in the +Z-axis direction in FIGS. 4 and 5). The casing 10 is formed of aluminum, stainless steel, or iron, for example.

The electrode assembly 20 may have a wound configuration that is formed by stacking a sheet positive electrode, a sheet negative electrode, a sheet lithium electrode, and a sheet separator to form a laminated sheet, and winding the laminated sheet (not illustrated in the drawings). The electrode assembly 20 may have a laminated configuration that is formed by stacking a sheet positive electrode, a sheet negative electrode, a sheet lithium electrode, and a sheet separator to form a laminated sheet, and stacking a plurality of the laminated sheets in the stacking direction. The lithium electrode is dissolved in the electrolyte solution to produce lithium ions. The lithium ions are electrochemically doped (pre-doped) into the negative electrode active material layer of the negative electrode through the electrolytic solution. The potential of the negative electrode thus decreases. The electrode assembly 20 can serve as a power generation part of the electrical storage device 100.

As illustrated in FIGS. 4 and 5, the sealing plate 30 is provided in the opening 12 of the casing 10. The sealing plate 30 is bonded to the casing 10 by welding, for example. A through-hole 32 is formed in the sealing plate 30. The internal terminal 60 and the gasket 62 extend through the through-hole 32. The sealing plate 30, the internal terminal 60, the gasket 62, and the casing 10 form a closed (sealed) space 2, and the electrode assembly 20 and the electrolyte solution are situated in the closed space 2. The shape of the sealing plate 30 is not particularly limited as long as the sealing plate 30 can form the closed space 2. The sealing plate 30 is formed of aluminum, stainless steel, or iron, for example.

A safety valve 34 is provided to the sealing plate 30. In the example illustrated in FIG. 3, the safety valve 34 is provided at the center of the sealing plate 30. The safety valve 34 is opened when the pressure inside the closed space 2 has increased to a value equal to or larger than a predetermined value, and releases gas from the closed space 2 to the outside through a through-hole 56 formed in the holder 50. It is possible to suppress an increase in pressure inside the closed space 2 by opening the safety valve 34.

The terminal plate 40 is provided over the sealing plate 30. The terminal plate 40 is electrically connected to the electrode assembly 20. A terminal plate 40a and a terminal plate 40b are provided as the terminal plate 40. The terminal plate 40a is a negative electrode terminal plate, and the terminal plate 40b is a positive electrode terminal plate.

The terminal plate 40a is electrically connected to the negative electrode of the electrode assembly 20. In the example illustrated in FIGS. 4 and 5, the terminal plate 40a is connected to the negative electrode of the electrode assembly 20 through the internal terminal 60 and the lead 64. The terminal plate 40a is formed of copper or nickel, for example.

The terminal plate 40b is electrically connected to the positive electrode of the electrode assembly 20. The terminal plate 40b is connected to the positive electrode of the electrode assembly 20 through the internal terminal and the lead in the same manner as the terminal plate 40a. When the positive electrode of the electrode assembly 20 is electrically connected to the casing 10, the terminal plate 40b may be electrically connected to the positive electrode of the electrode assembly 20 by bringing the lead into contact with the casing 10. In this case, it is unnecessary to provide the gasket 62 to the terminal plate 40b. The terminal plate 40b is formed of aluminum, for example.

The terminal plate 40a and the terminal plate 40b basically have an identical shape. The following description focuses on the terminal plate 40a (40), and detailed description of the terminal plate 40b is omitted.

The terminal plate 40 has a step, a slope, a protrusion, or a recess in an area in which the terminal plate 40 comes in contact with the holder 50. The terminal plate 40 is placed so that the terminal plate 40 is fitted to the holder 50. The terminal plate 40 is held by the holder 50 so that the terminal plate 40 is not displaced due to rotation torque. A detailed configuration when the terminal plate 40 has a step is described below.

The terminal plate 40 has a first plane (upper side in the example illustrated in the drawings) 44, a second plane (lower side in the example illustrated in the drawings) 46, and a third side (side surface in the example illustrated in the drawings) 48. In the example illustrated in the drawings, the first plane 44 faces in the +Z-axis direction, and is situated at the end of the terminal plate 40 in +Z-axis direction (upward direction). The first plane 44 forms an outer surface (i.e., a surface that faces the outside of the electrical storage device 100). As illustrated in FIG. 3, the first plane 44 comes in contact with the bus bar 80. The second plane 46 is situated opposite to the first plane 44. In the example illustrated in the drawings, the second plane 46 faces in the −Z-axis direction, and is situated at the end of the terminal plate 40 in the −Z-axis direction (downward direction). The second plane 46 forms an inner surface (i.e., a surface that faces the inside of the electrical storage device 100). The second plane 46 is situated on the side of the electrode assembly 20, for example. The second plane 46 comes in contact with the holder 50 and the gasket 62.

As illustrated in FIG. 6, the first plane 44 and the second plane 46 of the terminal plate 40 have a chamfered approximately rectangular shape (i.e., an approximately rectangular shape in which the long side extends along the X-axis, and the short side extends along the Y-axis in the example illustrated in FIG. 6) in a plan view (i.e., when viewed along the Z-axis direction in the example illustrated in FIG. 6). The area of the first plane 44 is larger than the area of the second plane 46. In the example illustrated in FIG. 6, the dimension L1 of the first plane 44 in the Y-axis direction is larger than the dimension L2 of the second plane 46 in the Y-axis direction. The dimension of the first plane 44 in the X-axis direction may be the same as the dimension of the second plane 46 in the X-axis direction. The ratio (L1/L2) of the dimension L1 of the first plane 44 in the Y-axis direction to the dimension L2 of the second plane 46 in the Y-axis direction is 1.1 to 1.5, for example. If the ratio (L1/L2) is less than 1.1, the holder 50 that comes in contact with the terminal plate 40 may be tilted due to rotation when securing the bus bar 80 using the nut 72, and it may be impossible to increase the area of contact between the terminal plate 40 and the bus bar 80 (i.e., an increase in resistance may occur). If the ratio (L1/L2) exceeds 1.5, the holder 50 may not be able to hold the terminal plate 40 since the area of the metal part that forms the terminal plate 40 decreases, and an increase in resistance may occur due to a decrease in area of the metal part. The second plane 46 is formed so as not to extend beyond the outer edge of the first plane 44. It is preferable that the terminal plate 40 in which the first plane 44 is larger than the second plane 46, and the third side 48 has a step, have a flange (see FIG. 4). It is particularly preferable that the terminal plate 40 have a flange along the longitudinal direction of the terminal plate 40.

The dimension of the first plane 44 in the X-axis direction may be larger than the dimension of the second plane 46 in the X-axis direction (not illustrated in the drawings). Specifically, the outer edge of the second plane 46 may be situated inside the outer edge of the first plane 44.

As illustrated in FIG. 4, the third side 48 of the terminal plate 40 connects the first plane 44 and the second plane 46. The third side 48 has a step. The third side 48 comes in contact with the holder 50. Specifically, the terminal plate 40 has a step in an area in which the terminal plate 40 comes in contact with the holder 50.

The holder 50 is provided to surround the terminal plate 40 (i.e., on the side of the terminal plate 40 in the X-axis direction and the Y-axis direction in the example illustrated in the drawings). In the example illustrated in the drawings, the holder 50 is provided on the sealing plate 30 so as to insulate the sealing plate 30 and the terminal plate 40. The holder 50 has a recess 52. The recess 52 has a planar shape that corresponds to the second plane 46 of the terminal plate 40, and the terminal plate 40 is fitted to the recess 52. The holder 50 holds the terminal plate 40. The holder 50 has insulating properties. The holder 50 is formed of a resin such as polyethylene (PE), polypropylene (PP), polyphenylene sulfide (PPS), or a polycarbonate (PC), for example.

The internal terminal 60 connects the terminal plate 40 and the lead 64 connected to the electrode assembly 20. In the example illustrated in the drawings, the internal terminal 60 extends through the through-hole 63 formed in the gasket 62. The internal terminal 60 is bonded to the terminal plate 40 that defines the through-hole 42 by welding, for example. The lead 64 is bonded to the internal terminal 60 and the electrode assembly 20 by welding, for example. The internal terminal 60 and the lead 64 are formed of copper, nickel, or aluminum, for example.

The gasket 62 is provided between the internal terminal 60 and the sealing plate 30 and between the internal terminal 60 and the holder 50. More specifically, the gasket 62 extends through the through-hole 32 formed in the sealing plate 30, and the through-hole 54 formed in the holder 50. The gasket 62 has insulating properties. The internal terminal 60 and the sealing plate 30 are electrically isolated by the gasket 62. The gasket 62 is formed of a resin such as polyethylene (PE), polypropylene (PP), polyphenylene sulfide (PPS), or a perfluoroalkoxyfluororesin (PFA), for example.

The bolt 70 is provided on the first plane 44 of the terminal plate 40 (i.e., provided on the terminal plate 40). The bolt 70 protrudes upward from the terminal plate 40. The bolt 70 is electrically connected to the terminal plate 40. The bolt 70 is formed of the same material as that of the terminal plate 40, for example.

As illustrated in FIG. 3, the bus bar 80 is provided on the first plane 44 of the terminal plate 40. The bus bar 80 comes in contact with the first plane 44. A through-hole 82 into which the bolt 70 is inserted is formed in the bus bar 80. The bus bar 80 is a connection member that can electrically connect a plurality of the electrical storage devices 100 (see FIG. 9). The shape of the bus bar 80 is not particularly limited as long as the bus bar 80 can electrically connect a plurality of electrical storage devices 100. In the example illustrated in FIG. 3, the bus bar 80 has a rectangular planar shape. The bus bar 80 is formed of copper or aluminum, for example.

The nut 72 is fitted to the bolt 70. The nut 72 is formed of the same material as that of the bolt 70, for example. The bus bar 80 can be secured on the first plane 44 of the terminal plate 40 by fitting the nut 72 to the bolt 70.

Although an example in which the bolt 70 is provided on the first plane 44 (upper side) of the terminal plate 40 has been described above, another configuration may also be employed. For example, the nut may be provided to the lower side of the terminal plate 40 at a position at which the bolt 70 is provided, and the bus bar 80 may be secured using the bolt after providing the bus bar 80 on the upper side of the terminal plate 40, or the bus bar 80 may be provided on the terminal plate 40 in which the inner surface of the through-hole is threaded, and secured using the bolt 70.

The electrical storage device 100 is assembled using a method that includes the following steps (1) to (7), for example.

(1) As illustrated in FIGS. 4 and 5, the gasket 62 is molded using an insert molding method so as to extend through the through-hole 32. The internal terminal 60 is placed inside the through-hole 63, and the holder 50 is formed on the surface of the sealing plate 30.

(2) The terminal plate 40 is electrically connected to the bolt 70.

(3) The terminal plate 40 is placed in the recess 52 formed in the holder 50, and the terminal plate 40 that defines the through-hole 42 is welded to one end of the internal terminal 60.

(4) The other end of the internal terminal 60 is welded to one end of the lead 64.

(5) The other end of the lead 64 is welded to the electrode assembly 20 that is formed using a known method.

(6) The electrode assembly 20 is placed in the casing 10, and the casing 10 that defines the opening 12 is welded to the sealing plate 30.

(7) The electrolyte solution is injected from the position of the safety valve 34, and the safety valve is welded to the sealing plate 30 to obtain the electrical storage device 100.

When producing an electrical storage module using the resulting electrical storage device 100, the through-hole 82 formed in the bus bar 80 is fitted to the bolt 70, and the nut 72 is screwed to electrically connect the adjacent electrical storage devices 100.

The electrical storage device 100 has the following features, for example.

The electrical storage device 100 is configured so that the holder 50 is provided to surround (on the side of) the terminal plate 40. The terminal plate 40 has a step in an area in which the terminal plate 40 comes in contact with the holder 50. This makes it possible to increase the area of the first plane 44 (upper side) of the terminal plate 40 as compared with the area of the second plane 46 (lower side) of the terminal plate 40. Therefore, it is possible to prevent the holding power of the holder 50 that holds the terminal plate 40 from being excessively decreased while reducing the contact resistance between the terminal plate 40 and the bus bar 80. Specifically, the area of contact between the terminal plate 40 and the bus bar 80 can be increased by increasing the area of the first plane 44 that comes in contact with the bus bar 80 as compared with the area of the second plane 46. This makes it possible to reduce the contact resistance between the terminal plate 40 and the bus bar 80. It is possible to increase the dimension (in the Y-axis direction in the example illustrated in FIG. 4) W of the part of the holder 50 that is situated on the side of the terminal plate 40 (in the Y-axis direction in the example illustrated in FIG. 4) by decreasing the area of the second plane 46 as compared with the area of the first plane 44. This makes it possible to prevent the holding power of the holder 50 that holds the terminal plate 40 from being excessively decreased. Therefore, it is possible to suppress a situation in which the terminal plate 40 is rotated, and the holder 50 (i.e., the part of the holder 50 that is situated on the side of the terminal plate 40) is tilted, even when a torque pressure is applied in the rotation direction of the nut 72 when securing the bus bar 80 on the terminal plate 40 by fitting the nut 72 to the bolt 70. This makes it possible to suppress a situation in which the terminal plate 40 is disconnected from the electrode assembly 20. A known technique increases the width of the casing 10 in the ±Y-axis direction (see FIG. 4) in order to provide a sufficient dimension W, achieves a decrease in resistance by increasing the area of contact between the terminal plate 40 and the bus bar 80, and suppresses a situation in which the holder 50 is tilted by increasing the dimension W. According to the electrical storage device 100, since it is unnecessary to increase the width of the casing 10 in the ±Y-axis direction by providing the step, it is possible to implement a compact electrical storage device.

The electrical storage device 100 is configured so that the ratio (L1/L2) of the dimension L1 of the first plane 44 of the terminal plate 40 in the Y-axis direction to the dimension L2 of the second plane 46 of the terminal plate 40 in the Y-axis direction is 1.1 to 1.5. This makes it possible to more reliably prevent the holding power of the holder 50 that holds the terminal plate 40 from being excessively decreased while reducing the contact resistance between the terminal plate 40 and the bus bar 80.

2. Modifications of Electrical Storage Device 2.1. First Modification

An electrical storage device according to a first modification is described below with reference to the drawings.

FIGS. 7 and 8 are plan views schematically illustrating an electrical storage device 200 according to the first modification. In FIG. 8, the members other than the terminal plate 40a (40), the bolt 70, and the nut 72 are omitted for convenience of illustration.

The following description focuses on the differences between the electrical storage device 200 according to the first modification and the electrical storage device 100, and description of the same features is omitted. This also applies to an electrical storage device 210 according to a second modification, an electrical storage device 220 according to a third modification, an electrical storage device 230 according to a fourth modification, and an electrical storage device 232 according to a fifth modification.

As illustrated in FIGS. 5 and 6, the electrical storage device 100 is configured so that the terminal plate 40 does not have a part in which the dimension L1 of the first plane 44 in the Y-axis direction is equal to the dimension L2 of the second plane 46 in the Y-axis direction (i.e., the dimension L1 of the first plane 44 in the Y-axis direction is larger than the dimension L2 of the second plane 46 in the Y-axis direction over the entire terminal plate 40).

As illustrated in FIGS. 7 and 8, the electrical storage device 200 is configured so that the terminal plate 40 has a part in which the dimension L1 of the first plane 44 in the Y-axis direction is equal to the dimension L2 of the second plane 46 in the Y-axis direction. Specifically, the terminal plate 40 has a first part 240 in which the dimension L1 of the first plane 44 in the Y-axis direction is larger than the dimension L2 of the second plane 46 in the Y-axis direction, and a second part 242 in which the dimension L1 of the first plane 44 in the Y-axis direction is equal to the dimension L2 of the second plane 46 in the Y-axis direction.

The first plane 44 included in the first part 240 is a connection part 244 that overlaps the bus bar 80 in a plan view. Specifically, the connection part 244 is an area of the first plane 44 that is used to electrically connect the electrical storage device 200 to another electrical storage device, and comes in contact with the bus bar 80 when an electrical storage module is produced using the electrical storage device 200. The second plane 46 included in the first part 240 is a non-connection area 246 that is situated opposite to the connection part 244. The second part 242 is a non-connection part that does not overlap the bus bar 80 in a plan view. The first part 240 has a flange 241. The flange 241 is a part of the first plane 44 that does not overlap the second plane 46.

The electrical storage device 200 is configured so that the area of the connection part 244 of the first plane 44 of the terminal plate 40 that is used to electrically connect the electrical storage device 200 to another electrical storage device is larger than the area of the non-connection area 246 of the second plane 46 of the terminal plate 40 that is situated opposite to the connection part 244 in a plan view.

2.2. Second Modification

Figure 9:
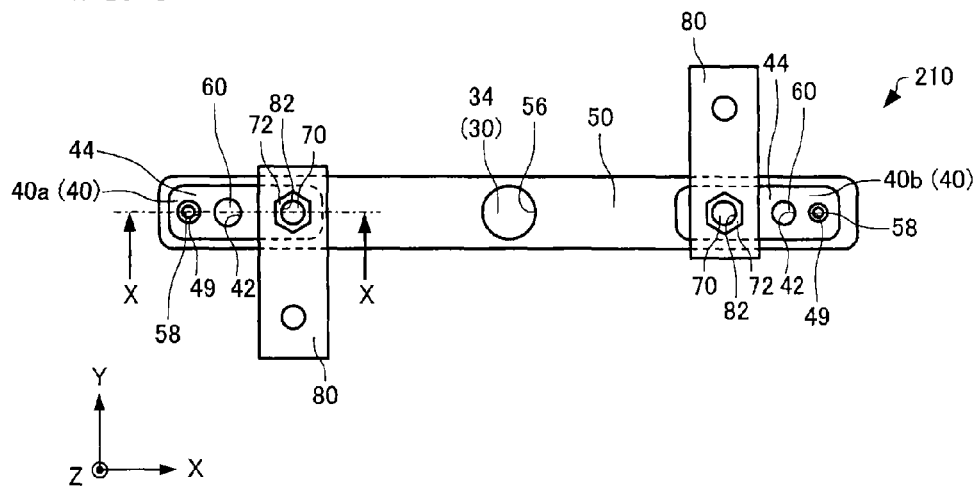
FIG. 9 is a plan view schematically illustrating an electrical storage device according to a second modification.
Figure 10:
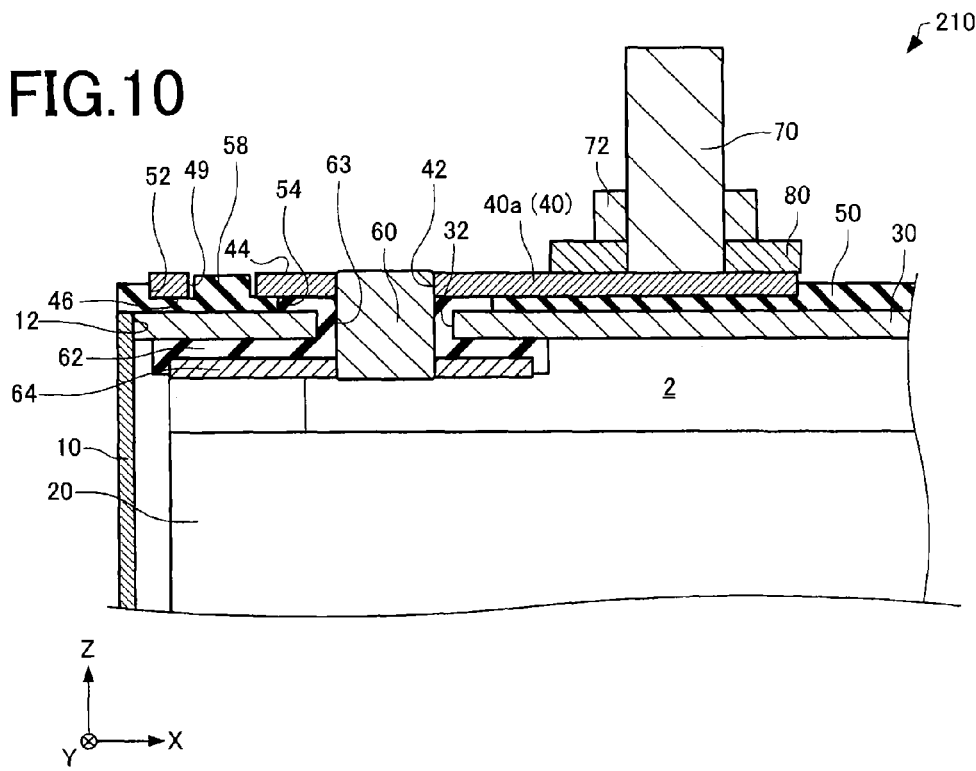
FIG. 10 is a cross-sectional view schematically illustrating an electrical storage device according to a second modification.

The electrical storage device according to the second modification is described below with reference to the drawings. FIG. 9 is a plan view (perpendicular to the Z-axis direction) schematically illustrating the electrical storage device 210 according to the second modification. FIG. 10 is a cross-sectional view (taken along the line X-X in FIG. 9) schematically illustrating the electrical storage device 210 according to the second modification.

The electrical storage device 210 differs from the electrical storage device 100 in that the holder 50 has a protrusion 58 (see FIGS. 9 and 10). The protrusion 58 is situated in a hole 49 that is formed in the terminal plate 40. In the examples illustrated in FIGS. 9 and 10, the protrusion 58 is formed on the bottom of the recess 52, and protrudes upward (in the +Z-axis direction) from the bottom of the recess 52. The shape of the protrusion 58 is not particularly limited as long as the protrusion 58 is situated in the hole 49. In the example illustrated in FIGS. 9 and 10, the protrusion 58 has a cylindrical shape. The protrusion 58 is situated inside the outer edge of the hole 49. Note that the number of the protrusions 58 is not particularly limited.

The hole 49 is formed through the terminal plate 40 in the Z-axis direction. As illustrated in FIG. 9, the internal terminal 60 may be situated between the hole 49 and the bolt 70. Note that the hole 49 may be formed in the terminal plate 40a at a position in the +X-axis direction with respect to the bolt 70, and the hole 49 may be formed in the terminal plate 40b at a position in the −X-axis direction with respect to the bolt 70 (not illustrated in the drawings).

The electrical storage device 210 is configured so that the hole 49 is formed in the terminal plate 40, and the holder 50 has the protrusion 58 that is situated in the hole 49. Therefore, it is possible to suppress a situation in which the terminal plate 40 is rotated, and the holder 50 is tilted, even when a torque pressure is applied in the rotation direction of the nut 72 when securing the bus bar 80 on the terminal plate 40 by fitting the nut 72 to the bolt 70, for example.

The shape of the hole 49 is not particularly limited as long as the protrusion 58 can be situated in the hole 49. For example, a recess may be formed in the lower side (second plane) 46 of the terminal plate 40 (not illustrated in the drawings) instead of forming the hole 49 in the terminal plate 40. Such a structure can also achieve the above advantageous effect.

2.3. Third Modification

Figure 11:
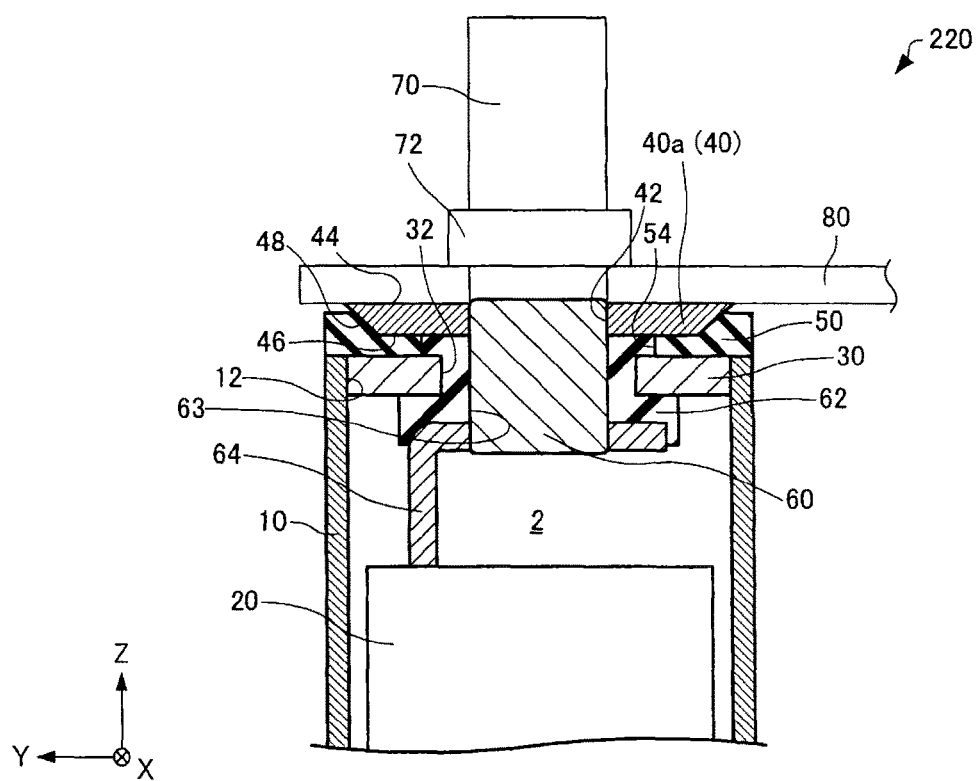
FIG. 11 is a cross-sectional view schematically illustrating an electrical storage device according to a third modification.

The electrical storage device according to the third modification is described below with reference to the drawings. FIG. 11 is a cross-sectional view schematically illustrating the electrical storage device 220 according to the third modification, and corresponds to FIG. 4.

The electrical storage device 100 is configured so that the third side 48 of the terminal plate 40 has a step (see FIG. 4).

As illustrated in FIG. 11, the electrical storage device 220 is configured so that the third side 48 of the terminal plate 40 does not have a step, and is sloped with respect to the first plane 44 and the second plane 46. Specifically, the terminal plate 40 has a slope in an area in which the terminal plate 40 comes in contact with the holder 50. The third side 48 is a plane (planar surface) (reverse tapered plane) that is sloped with respect to the first plane 44 and the second plane 46. This makes it possible to increase the area of the first plane 44 of the terminal plate 40 as compared with the area of the second plane 46 of the terminal plate 40. The terminal plate 40 is formed by pressing, for example.

According to the electrical storage device 220, it is possible to prevent the holding power of the holder 50 that holds the terminal plate 40 from being excessively decreased while reducing the contact resistance between the terminal plate 40 and the bus bar 80. Since it is possible to increase the width of the holder 50 in the ±Y-axis direction, it is possible to implement a compact electrical storage device.

2.4. Fourth Modification

Figure 12:
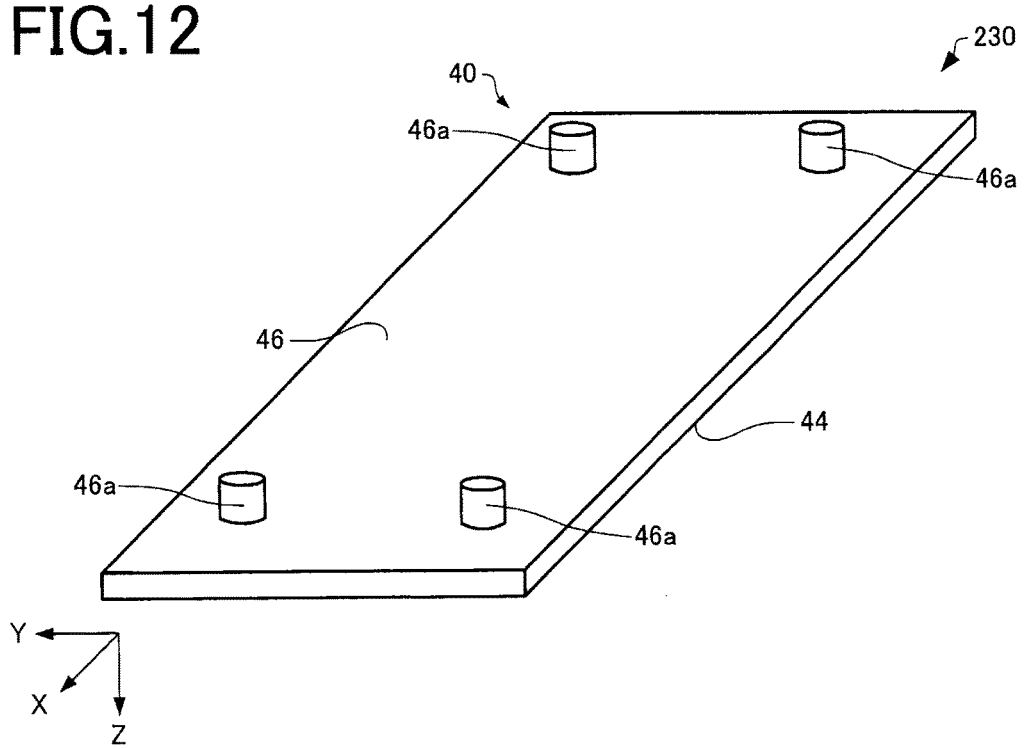
FIG. 12 is a perspective view schematically illustrating a terminal plate included in an electrical storage device according to a fourth modification.

The electrical storage device according to the fourth modification is described below with reference to the drawings. FIG. 12 is a perspective view schematically illustrating the terminal plate 40 included in the electrical storage device 230 according to the fourth modification.

The electrical storage device 230 differs from the electrical storage device 100 in that a protrusion 46a is formed on the second plane 46 (see FIG. 12). Specifically, the terminal plate 40 has the protrusion 46a in an area in which the terminal plate 40 comes in contact with the holder 50. A recess (not illustrated in the drawings) is formed in the holder 50, and the protrusion 46a is fitted into the recess formed in the holder 50. The number of protrusions 46a, and the shape of the protrusion 46a are not particularly limited.

According to the electrical storage device 230, it is possible to prevent the holding power of the holder 50 that holds the terminal plate 40 from being excessively decreased by providing the protrusion 46a that is fitted into the recess formed in the holder 50. Since it is unnecessary to decrease the size of the terminal plate 40, and increase the size of the holder 50 in order to increase the holding power of the holder 50 that holds the terminal plate 40, it is possible to reduce the contact resistance between the terminal plate 40 and the bus bar.

2.5. Fifth Modification

Figure 13:
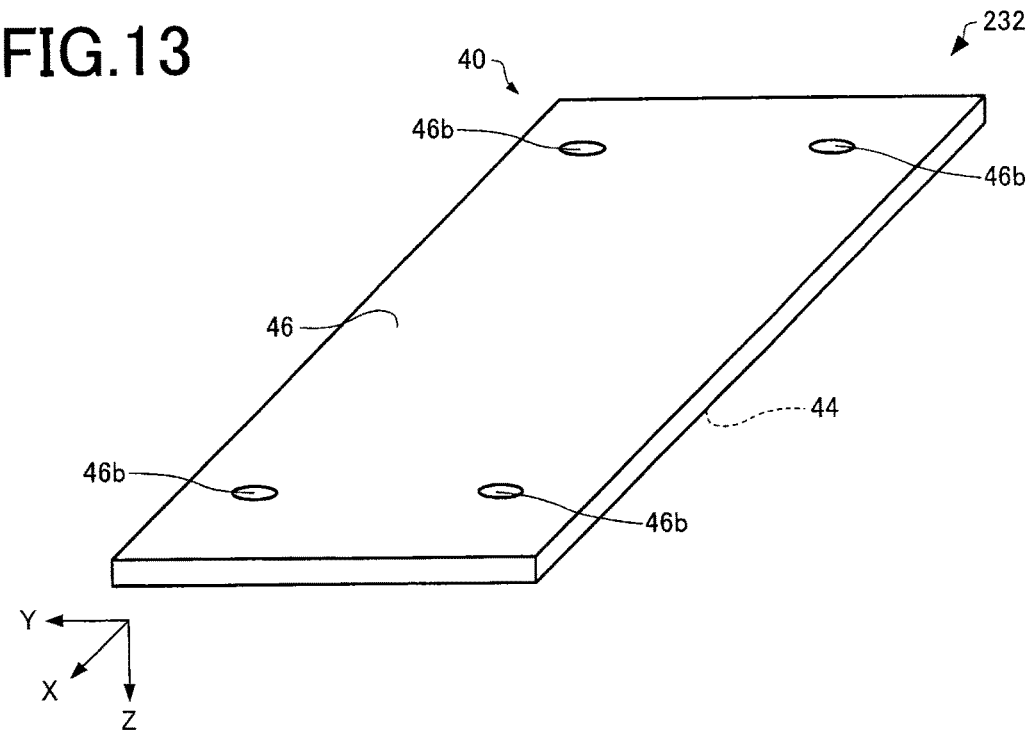
FIG. 13 is a perspective view schematically illustrating a terminal plate included in an electrical storage device according to a fifth modification.

The electrical storage device according to the fifth modification is described below with reference to the drawings. FIG. 13 is a perspective view schematically illustrating the terminal plate 40 included in the electrical storage device 232 according to the fifth modification.

The electrical storage device 232 differs from the electrical storage device 100 in that a recess 46b is formed in the second plane 46 (see FIG. 13). Specifically, the terminal plate 40 has the recess 46b in an area in which the terminal plate 40 comes in contact with the holder 50. A protrusion (not illustrated in the drawings) is formed on the holder 50, and fitted into the recess 46b. The number of the recesses 46b, and the shape of the recess 46b are not particularly limited.

According to the electrical storage device 232, it is possible to prevent the holding power of the holder 50 that holds the terminal plate 40 from being excessively decreased by providing the recess 46b into which the protrusion formed on the holder 50 is fitted. Since it is unnecessary to decrease the size of the terminal plate 40, and increase the size of the holder 50 in order to increase the holding power of the holder 50 that holds the terminal plate 40, it is possible to reduce the contact resistance between the terminal plate 40 and the bus bar.

3. Electrical Storage Module

Figure 14:
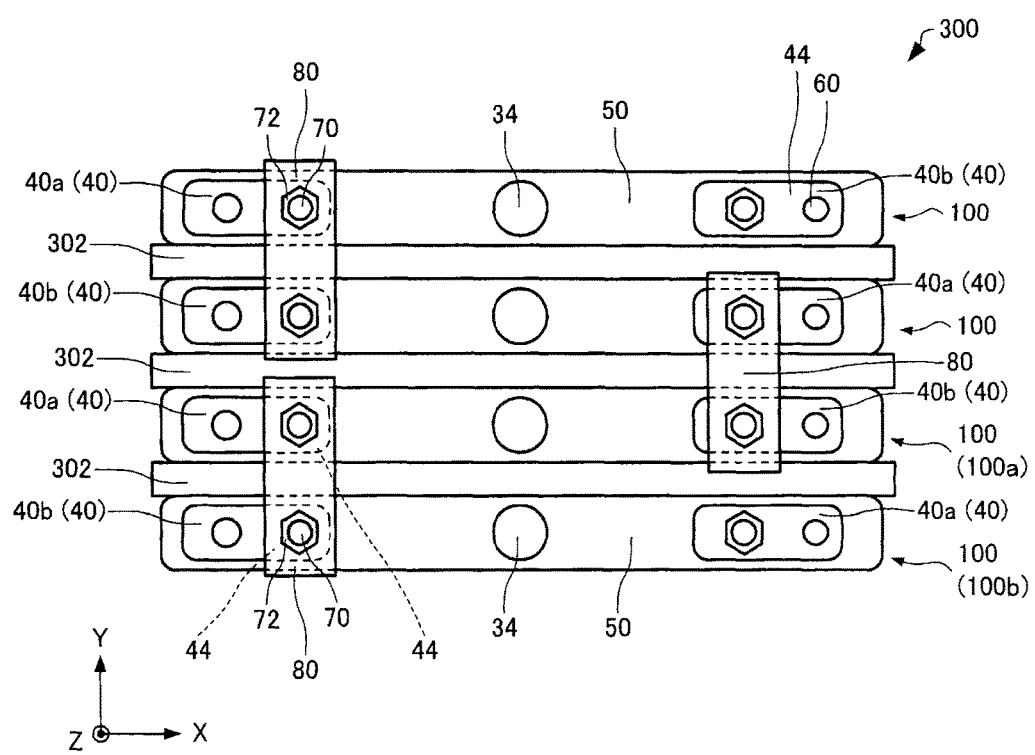
FIG. 14 is a plan view schematically illustrating an electrical storage module according to one embodiment of the invention.

An electrical storage module according to one embodiment of the invention is described below with reference to the drawings. FIG. 14 is a plan view schematically illustrating an electrical storage module 300 according to one embodiment of the invention.

The electrical storage module 300 includes the electrical storage device according to one embodiment of the invention. The following description illustrates an example in which the electrical storage device 100 is used as the electrical storage device according to one embodiment of the invention.

The electrical storage module 300 includes a plurality of electrical storage devices 100. In the example illustrated in FIG. 14, the electrical storage module 300 includes four electrical storage devices 100. Note that the number of electrical storage devices 100 included in the electrical storage module 300 is not particularly limited, and may be appropriately changed taking account of the application of the electrical storage module 300. The plurality of electrical storage devices 100 are stacked in the Y-axis direction, for example. A cell isolation member 302 is placed between the adjacent electrical storage devices 100. The cell isolation member 302 is formed of a resin (e.g., plastic), for example. The cell isolation member 302 can electrically and thermally insulate the adjacent electrical storage devices 100.

The bus bar (connection member) 80 electrically connects the adjacent electrical storage devices 100. Specifically, the bus bar 80 electrically connects the first planes 44 of the terminal plates 40 of the adjacent electrical storage devices 100. More specifically, the bus bar 80 electrically connects the first plane 44 of the terminal plate 40 of an electrical storage device 100a and the first plane 44 of the terminal plate 40 of an electrical storage device 100b. The electrical storage device 100a and the electrical storage device 100b are situated adjacent to each other. In the example illustrated in FIG. 14, the bus bar 80 electrically connects the adjacent electrical storage devices 100 in series. Note that the bus bar 80 may electrically connect the adjacent electrical storage devices 100 in parallel (not illustrated in FIG. 14).

The electrical storage module 300 can achieve a high output as compared with the electrical storage device 100.

The invention is not limited to the above embodiments, and various modifications and variations may be made of the above embodiments. For example, a plurality of embodiments and/or a plurality of modifications described above may be appropriately combined.

The invention is not limited to the above embodiments, and various modifications and variations may be made. The invention includes various other configurations substantially the same as the configurations described in connection with the above embodiments (such as a configuration having the same function, method, and results, or a configuration having the same objective and results). The invention also includes configurations in which an unsubstantial part described in connection with the above embodiments is replaced by another part. The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

REFERENCE SIGNS LIST

2: closed space, 10: casing, 12: opening, 20: electrode assembly, 30: sealing plate, 32: through-hole, 34: safety valve, 40: terminal plate, 42: through-hole, 44: first plane (upper side), 46: second plane (lower side), 46a: protrusion, 46b: recess, 48: third side (side), 49: hole, 50: holder, 52: recess, 54: through-hole, 56: through-hole, 58: protrusion, 60: internal terminal, 62: gasket, 63: through-hole, 64: lead, 70: bolt, 72: nut, 80: bus bar, 82: through-hole, 100: electrical storage device, 200: electrical storage device, 210, 220, 230, 232: electrical storage device, 240: first part, 241: flange, 242: second part, 244: connection part, 246: non-connection area, 300: electrical storage module, 302: cell isolation member

The invention claimed is:

1. An electrical storage device comprising:
a casing;
an electrode assembly that is placed inside the casing;
a terminal plate that is electrically connected to the electrode assembly; and
a holder that is provided to surround the terminal plate,
the terminal plate having a step or a slope in an area in which the terminal plate comes in contact with the holder, an area of a first plane of the terminal plate that is situated on an outer side being larger than an area of a second plane of the terminal plate that is situated opposite to the first plane, a third side of the terminal plate that connects the first plane and the second plane having the step or the slope, the terminal plate having a shape that has a side extending along a longitudinal direction in a plan view, a dimension of the first plane in the longitudinal direction being the same as a dimension of the second plane in the longitudinal direction, and a ratio of a dimension of the first plane in a direction perpendicular to the longitudinal direction to a dimension of the second plane in the direction perpendicular to the longitudinal direction being 1.1 to 1.5.

2. The electrical storage device according to claim 1, the electrical storage device being a lithium-ion capacitor.

3. An electrical storage module comprising:

the electrical storage device according to claim 1, the first plane of the terminal plate included in the electrical storage device being electrically connected to the first plane of the terminal plate included in another electrical storage device through a connection member.

4. The electrical storage device according to claim 1, wherein a hole is formed in the terminal plate, and the holder has a protrusion that is situated in the hole.

5. The electrical storage device according to claim 2, wherein a hole is formed in the terminal plate, and the holder has a protrusion that is situated in the hole.

6. An electrical storage module comprising:

the electrical storage device according to claim 1, the first plane of the terminal plate included in the electrical storage device being electrically connected to the first plane of the terminal plate included in another electrical storage device through a connection member.

7. The electrical storage device according to claim 1, the electrical storage device comprising two terminal plates, one of the terminal plates being a negative electrode terminal plate, and the other of the terminal plates being a positive electrode terminal plate.

8. The electrical storage device according to claim 2, the electrical storage device comprising two terminal plates, one of the terminal plates being a negative electrode terminal plate, and the other of the terminal plates being a positive electrode terminal plate.

9. An electrical storage device comprising:

a casing;

an electrode assembly that is placed inside the casing;

a terminal plate that is electrically connected to the electrode assembly; and a holder that is provided to surround the terminal plate, the terminal plate having a step or a slope in an area in which the terminal plate comes in contact with the holder, wherein a hole is formed in the terminal plate, and the holder has a protrusion that is situated in the hole.

10. The electrical storage device according to claim 9, the electrical storage device comprising two terminal plates, one of the terminal plates being a negative electrode terminal plate, and the other of the terminal plates being a positive electrode terminal plate.

\* \* \* \* \*